Feb. 25, 1947.  J. T. THURSTON  2,416,656
CYANURIC CHLORIDE PREPARATION
Filed July 11, 1944
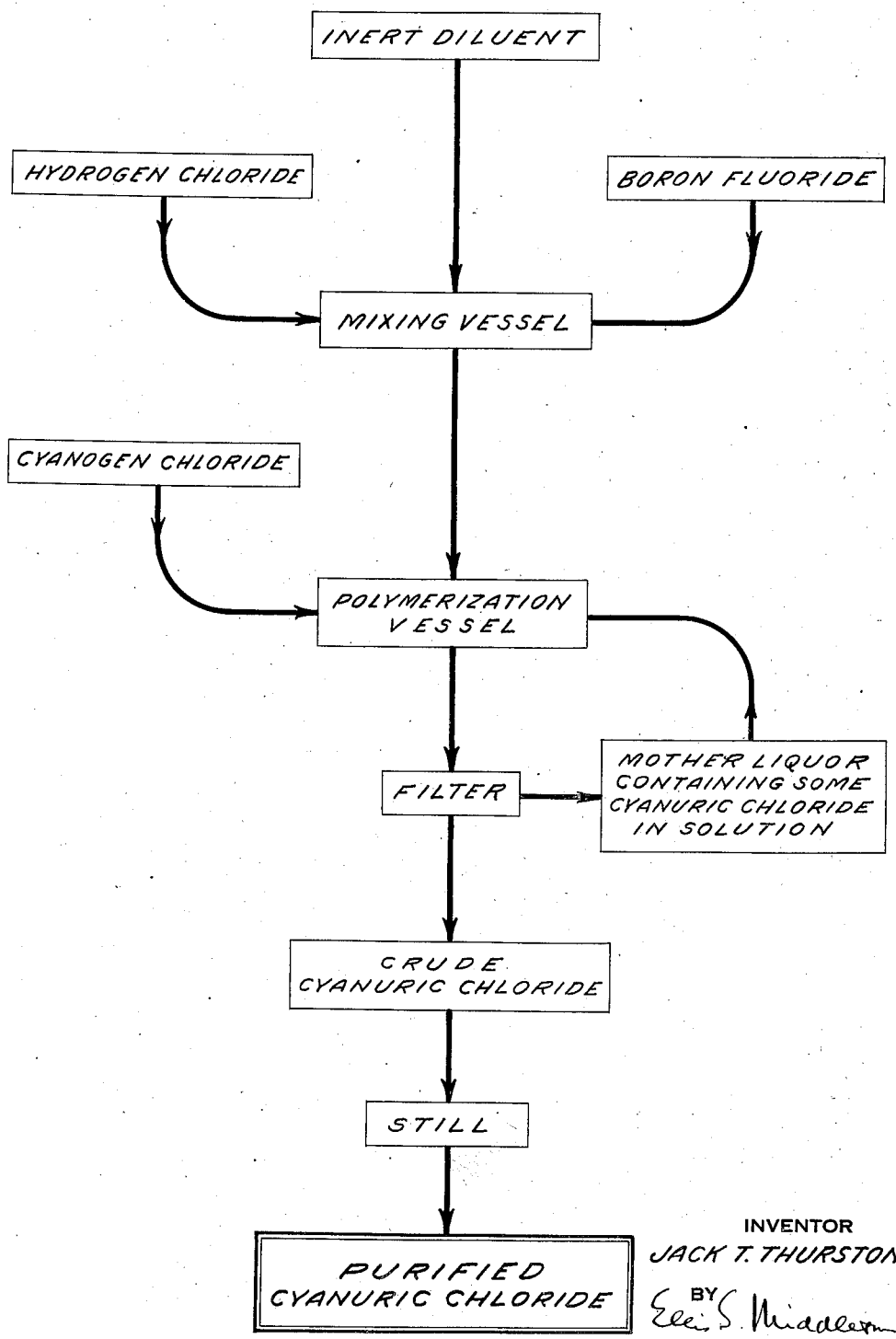
INVENTOR
JACK T. THURSTON,
BY
Elec S. Middleton
ATTORNEY Patented Feb. 25, 1947

2,416,656

UNITED STATES PATENT OFFICE 2,416,656

CYANURIC CHLORIDE PREPARATION

Jack T. Thurston, Riverside, Conn., assignor to American Cyanamid Company, New York, N. Y., a corporation of Maine Application July 11, 1944, Serial No. 544,411

6 Claims. (Cl. 260—248)

The present invention is concerned with the production of cyanuric chloride by polymerizing cyanogen chloride.

It has been found that cyanuric chloride may be prepared in good yield and of high purity by polymerizing cyanogen chloride in the presence of hydrogen chloride as a catalyst, using a mixture of an aliphatic ether such as dioxane and a chlorinated hydrocarbon such as chloroform as an inert diluent and heat transfer medium for the reaction mixture. The polymerization proceeds slowly inasmuch as it is necessary that the reaction mixture be kept at a low temperature, for example from 0 to 10° C., in order to avoid volatilization losses of the low-boiling cyanogen chloride.

It has now been discovered that the polymerization of cyanogen chloride using hydrogen chloride as the catalyst in a diluted reaction mixture can be carried out in a relatively short space of time by raising the temperature of the reaction mixture to the boiling point of cyanogen chloride or above and at the same time avoiding loss of the cyanogen chloride by having it form a non-volatile complex as it enters the reaction mixture. The latter is accomplished by having present in the mixture a quantity of boron fluoride sufficient to form the complex with the cyanogen chloride as added.

While it is believed that the boron fluoride forms a complex which is non-volatile at the operating temperatures, yet this explanation should not be taken in a restricted sense. It has been demonstrated however, that without the boron fluoride, a lower operating temperature is necessary if losses of the volatile cyanogen chloride are to be kept at a minimum while with boron fluoride higher temperatures may be used still without loss of cyanogen chloride. There is evidence that the boron fluoride does not act as a catalyst as no yield of cyanuric chloride was obtained in a run omitting the hydrogen chloride but in the presence of boron fluoride.

Any desirable inert liquid may be used as a diluent for the reaction mixture which has the necessary heat transfer properties, so as to prevent the reaction mass from becoming too thick or viscous, and to absorb the large quantity of exothermic heat generated by the polymerization. While aliphatic ethers and chlorinated hydrocarbons in general such as isopropyl ether, n-butyl ether, butyl cellosolve, diethyl cellosolve, dioxane, ethylene dichloride, carbon tetrachloride, chlorobenzene, chloroform and trichloroethylene, are preferred, other aliphatic ethers and/or chlorinated hydrocarbons may be used. Likewise such diluents may be ketones, hydrocarbons, nitriles, nitrated aromatic compounds and the like or admixtures thereof, so long as such materials conform to the above definition.

The invention therefore contemplates the production of cyanuric chloride by bringing together cyanogen chloride, hydrogen chloride, an inert diluent and boron fluoride, and recovering the cyanuric chloride thus formed.

In the drawing, the single figure shows a flow sheet of the preferred process.

In carrying out the preferred process, gaseous boron fluoride and gaseous hydrogen chloride are dissolved in dioxane in a closed reaction vessel provided with suitable means of agitation and temperature control. Chloroform is then added, followed by a gradual addition of the cyanogen chloride. The reaction mixture is allowed to warm slightly, and is held at a temperature preferably within the range of 20°–40° C.

After the addition of the cyanogen chloride is completed, the crystalline cyanuric chloride is recovered from the reaction mixture by filtration, or by settling followed by decantation of the mother liquor. The latter still containing some cyanuric chloride may be returned to the reaction vessel for another make up or cycle.

The crude product may be purified by recrystallization from a chlorine derivative of an aliphatic hydrocarbon, such as, for example, carbon tetrachloride, chloroform, ethylene dichloride, trichloroethylene or the like, or by distillation at atmospheric pressure.

Example 1

| Charge: | Grams |
|---|---|
| Cyanogen chloride | 120 |
| Hydrogen chloride | 20 |
| Dioxane | 40 |
| Chloroform | 40 |
| Boron fluoride (45% solution in ethyl ether) | 28 |

The hydrogen chloride was dissolved in the dioxane which was cooled in an ice-bath. The boron fluoride solution and the chloroform were then added, followed by the addition of the cyanogen chloride over a period of 4.5 hours, the temperature of the mixture being kept at about 30° C. Cyanuric chloride began to precipitate in about 2 hours after the initial addition of cyanogen chloride. The crude yield was 68%.

Example 2

Charge: | Grams
--- | ---
Cyanogen chloride | 2,808
Boron fluoride | 265
Hydrogen chloride | 235
Dioxane | 1,000
Chloroform | 500

The gaseous boron fluoride and hydrogen chloride were each dissolved in 500 g. of well-cooled dioxane, placed in a five-liter flask and the chloroform added. The mixture was stirred at about 30° C. and the cyanogen chloride added from a dropping funnel equipped with an ice-water jacket. Even when the temperature of the reaction mixture was as low as 20–23° C., addition of cyanogen chloride did not cause a rise in temperature, indicating that the polymerization was slow at those temperatures. However, at 30° C. it was necessary to use strong cooling. In this run the ice-bath was kept at 6–8° C. The temperature maintained in the cooling bath depended on the rate of addition of the cyanogen chloride. The addition of 2808 g. of cyanogen chloride required four hours, precipitation of the cyanuric chloride beginning after 35 minutes, at which time 420 g. of cyanogen chloride had been added. After the addition of cyanogen chloride was completed, the reaction mixture was allowed to stand until the precipitated cyanuric chloride had settled. The supernatant liquor was then siphoned off and the solid was washed with 500 cc. of dioxane. The crude yield was 2089 g. or 73.5%.

Example 3

The supernatant mother liquor and washings from the run of Example 2 were reused, 3222 g. of cyanogen chloride being added over a five hour period, while keeping the reaction temperature at 30–35° C. and the cooling bath at 3–7° C. The precipitated solid was filtered, washed with 500 cc. of dioxane, followed by 400 cc. of chloroform. The yield was 2657 g. (82.4%) of crude cyanuric chloride.

Example 4

Re-use of the supernatant mother liquor and washings from the run of Example 3 and the addition of 2868 g. of cyanogen chloride over a four hour period under substantially the same conditions as the previous example gave 2184 g. of crude cyanuric chloride, the latter being washed with 400 cc. of chloroform and 350 cc. of dioxane.

Example 5

A solution consisting of 509 g. of boron fluoride dissolved in 800 g. of dioxane was combined with a solution consisting of 310 g. of hydrogen chloride dissolved in 800 g. of dioxane. 900 g. of chloroform were added, the solution being agitated and held at about 30° C. 5136 g. of cyanogen chloride were gradually added over a period of about 5 hours, the temperature of the reaction mixture being kept between 30 and 35° C. The precipitated cyanuric chloride was filtered, washed with 500 cc. of dioxane, and then followed by 300 cc. of chloroform. 4,550 g. (88.6% yield) of the product were obtained, melting at 145° C.

Example 6

During a period of 10 hours, 10,080 g. of cyanogen chloride were added to the supernatant mother liquor and washings from the run of Example 5, the temperature of the reaction mixture being held at about 30° C. The crude product was crock-filtered, and washed with dioxane and chloroform. 8820 g. (87.5% yield) of cyanuric chloride were obtained.

The combined products of cyanuric chloride from the runs of Examples 2 to 6 inclusive totaled 20.3 kg. and represented an 84.2% yield from 24.1 kg. of cyanogen chloride. This combined product was distilled to give 17.02 kg. of pure cyanuric chloride. The distillation yield, based on the crude product, was 83.8%, while the overall yield of pure cyanuric chloride, based on cyanogen chloride, was 70.62%.

Example 7

A solution consisting of 32.3 g. of boron fluoride dissolved in 65.5 g. of isopropyl ether was combined with a solution consisting of 5.9 g. of hydrogen chloride dissolved in 19 g. of isopropyl ether. A mixture consisting of 72.4 g. of isopropyl ether and 100 g. of carbon tetrachloride was added, the mix being stirred and warmed to about 35° C. 123 g. of cyanogen chloride were then added during a period of one hour and thirty minutes, the temperature of the charge being held between 35 and 40° C. The resulting mixture, after standing over night (about 16 hours) at room temperature, was filtered. 90 g. of cyanuric chloride were obtained.

Example 8

A solution consisting of 18 g. of boron fluoride dissolved in 15.3 g. of diethyl Cellosolve (ethylene glycol diethyl ether) was combined with a solution consisting of 3.3 g. of hydrogen chloride dissolved in 11 g. of diethyl Cellosolve. A mixture consisting of 50.8 g. of diethyl Cellosolve and 33.4 g. of chlorobenzene was added, the mix being stirred and kept at about 30° C. 123 g. of cyanogen chloride were then added during a period of 35 minutes, the temperature of the charge being held between 30 and 35° C. After standing several hours at room temperature, the precipitated cyanuric chloride was removed by filtration. The crude yield was 69%.

Example 9

A solution consisting of 10 g. of boron fluoride dissolved in 17.2 g. of n-butyl ether was combined with a solution consisting of 2.7 g. of hydrogen chloride dissolved in 13 g. of n-butyl ether. A mixture consisting of 26.5 g. of n-butyl ether and 19.8 g. of ethylene dichloride was added, the mix being stirred and maintained at about 30° C. 123 g. of cyanogen chloride were then added during a period of one hour and 15 minutes, the temperature of the charge being held between 23° and 28° C. After the addition of the cyanogen chloride was completed, the reaction mixture was filtered to recover the precipitated cyanuric chloride.

Example 10

A solution consisting of 31 g. of boron fluoride dissolved in 30.6 g. of diethyl Cellosolve was combined with a solution consisting of 5 g. of hydrogen chloride dissolved in 22 g. of diethyl Cellosolve. A mixture consisting of 51.4 g. of diethyl Cellosolve and 66.8 g. of ethylene dichloride was added, the mix being stirred and warmed to about 35° C. 246 g. of cyanogen chloride were then added during a period of one hour, the temperature of the charge being held between 30 and 35° C. After standing several hours at room temperature, the precipitated cyanuric chloride was removed by filtration. A 71% yield of the product was obtained.

Cyanuric chloride is of particular value as an intermediate in the preparation of triazine compounds which may find application in the field of dyestuffs, explosives, synthetic resins, rubber and medicine.

While the invention has been described with particular reference to specific embodiments, it is to be understood that it is not to be limited thereto, but is to be construed broadly and restricted solely by the scope of the appended claims.

I claim:

1. A method of producing cyanuric chloride which comprises mixing cyanogen chloride, hydrogen chloride, an inert liquid diluent and boron fluoride at substantially atmospheric pressures, and recovering the cyanuric chloride.

2. A method of producing cyanuric chloride which comprises mixing cyanogen chloride and a mixture consisting of hydrogen chloride, boron fluoride, an aliphatic ether and a chlorinated hydrocarbon at substantially atmospheric pressures, and recovering the cyanuric chloride.

3. The method of claim 1 in which the mixture is maintained at a temperature within the range of 20–40° C.

4. The method of claim 1 in which the reaction mixture is maintained at a temperature between about 20 and 40° C., separating cyanuric chloride from the mixture and recrystallizing the cyanuric chloride from a chlorine derivative of an aliphatic hydrocarbon.

5. The method of claim 1 in which the reaction mixture is maintained at a temperature between about 20 and 40° C., separating cyanuric chloride from the mixture and reusing the remaining liquor in a subsequent run by bringing cyanogen chloride into contact with said liquor.

6. The method of claim 1 in which the diluent is a mixture of dioxane and chloroform.

JACK T. THURSTON.

REFERENCES CITED

The following references are of record in the file of this patent:

UNITED STATES PATENTS

| Number | Name | Date |
|---|---|---|
| 2,286,129 | Veltman | June 9, 1942 |

FOREIGN PATENTS

| Number | Country | Date |
|---|---|---|
| 399,464 | Canadian | 1941 |

OTHER REFERENCES

Official Gazette 544, O. G. 458 and 459.

"Catalysis," by Berkman (copy in Division 3), 1940, pages 958, 959, 962, 963, 964, 965, 966, 967, 968, 969, 971, 984.